April 1, 1969

R. R. BALDWIN 3,436,153

OBJECT MEASURING BY INTERFEROMETRY

Filed Oct. 5, 1965

INVENTOR.
Richard R. Baldwin
BY
ATTORNEY.

United States Patent Office 3,436,153
Patented Apr. 1, 1969

3,436,153
OBJECT MEASURING BY INTERFEROMETRY
Richard R. Baldwin, Clinton, Tenn., assignor to the United States of America as represented by the United States Atomic Energy Commission
Filed Oct. 5, 1965, Ser. No. 493,278
Int. Cl. G01b 9/02
U.S. Cl. 356—106     3 Claims

ABSTRACT OF THE DISCLOSURE

An interferometer is used to determine cross-sectional dimensions of objects of various configurations to within about 10 microinches of the actual dimension. The objects, one of which is of known cross-sectional dimensions, are placed between light-beam-splitting prisms disposed in a mirroring relationship. One of the objects is moved in one direction towards one of the prisms until a zero order fringe is viewed through this prism indicating equidistant spacing of the objects from the prism. The same object is then moved in measured increments in the opposite direction until the zero order fringe occurs in the other prism. The measured distance through which the object is moved between the zero order fringes when substracted from the known cross-sectional dimension of one of the objects provides the cross-sectional dimension of the other object.

---

The present invention relates generally to object measuring, and more particularly to measuring cross-sectional dimensions of objects of various configurations including those having a surface of revolution by utilizing optical interferometric measuring apparatus.

Close tolerance requirements of precision equipment necessitate the use of precisely made system components and the masters or standards used in their manufacture. For example, spherical masters may be utilized to determine runout of various types of inspection gauges, e.g., micrometers, used in the manufacture of precision system components and are preferably at least an order of magnitude more accurate than the capability of the inspection gauge being measured. Previous efforts in certifying the cross-sectional dimensions of these spherical standards or masters required to use of contact-type measuring devices which have attendant shortcomings or drawbacks. For example, a highly precision micrometer-type measuring device used for contact measuring may be relatively easily "knocked" out of adjustment without being readily detected by the operator as to provide inaccurate measurement readings. Most important, such contact measuring devices may compress the part during measurement or sufficiently damage the surface finish of the object being measured as to render the object unsuitable for its intended purpose, so that it is highly desirable to devise a measuring device that does not contact the object being measured.

The present invention aims to obviate or substantially minimize the above and other shortcomings or difficulties by providing an optical interferometer wherein cross-sectional dimensions of objects of various configurations may be accurately determined without contacting surfaces of the objects being measured and wherein minimal handling of the measuring mechanism minimizes the possibility of obtaining inaccurate readings.

An object of the present invention is to provide new and improved optical measuring means.

Another object of the present invention is to provide optical measuring means for accurately determining cross-sectional dimensions of objects of various configurations including objects having surfaces of revolution.

A further object of the present invention is to provide object measurements by interferometry practices whereby objects of unknown cross-sectional dimensions are measured by optically comparing the unknown dimensions to an object of known dimensions.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description. The preferred embodiment illustrated is not intended to be exhaustive nor to limit the invention to the precise form disclosed. It is chosen and described in order to best explain the principles of the invention and their application in practical use to thereby enable others skilled in the art to best utilize the invention in various embodiments and modifications as are best adapted to the particular use contemplated.

While the description and drawings hereinafter described are directed primarily to the measurement of objects having a surface of revolution, e.g., a spherical body, it is to be understood that the present invention is intended to also embrace the measurements of objects of other configurations, such as, for example, multi-sided objects having parallel faces.

Described generally, the interferometer of the present invention comprises a pair of light beam splitters, such as Kosters prisms which have well known optical properties, mounted on a suitable supporting structure at spaced-apart locations and so oriented with respect to each other that the faces of the prisms bordering the space therebetween are parallel to and mirror each other across the space. In this space intermediate the prisms a pair of objects may be adjustably positioned with one of the objects being of known cross-sectional dimensions and the other of unknown cross-sectional dimensions.

Briefly, the unknown cross-sectional dimension is determined by passing a light beam into one of the Kosters prisms wherein the light beam is divided into a pair of parallel exiting light beams in a well known manner. Portions of these parallel beams strike the surface of the objects exposed to the light beams and are reflected back into the prism to create an interference pattern readily perceivable to an observer looking into the prism, usually with aid of an optical device such as microscope. When the objects are equidistant from the prism the reflected portions of the parallel light beams are of the same length as to establish an interference pattern with a white zero-order fringe in the center of the pattern. If either object is moved towards or away from the prism as to cause the length of the reflected portions of the parallel beams to be no longer equal, the white zero-order fringe will leave the center of the pattern and be replaced by one of the two darker or black first-order fringes.

With the two objects positioned equidistant from the first prism the object of unknown dimensions may then be moved towards the other prism until an interference pattern similarly established and viewed through the other prism indicates that the objects are equidistant from the second prism. This distance through which the object of unknown dimensions has been moved may be determined by a suitable distance measuring device, e.g., a micrometer, and thereafter subtracted from the known cross-sectional dimensions of the object of known dimensions to give the cross-sectional dimensions of the unknown object. The accuracy of such a measurement may be within about 10 microinches, i.e., 0.000010 of an inch of the actual dimension.

Figure 1:
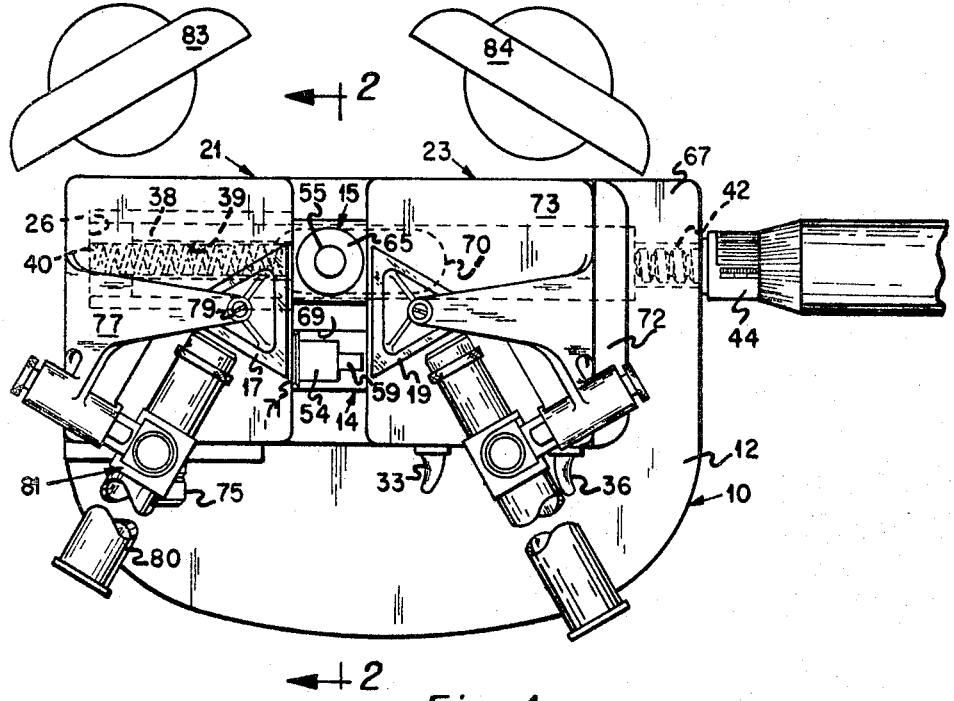
FIG. 1 is a top plan view of the interferometer of the present invention.
Figure 2:
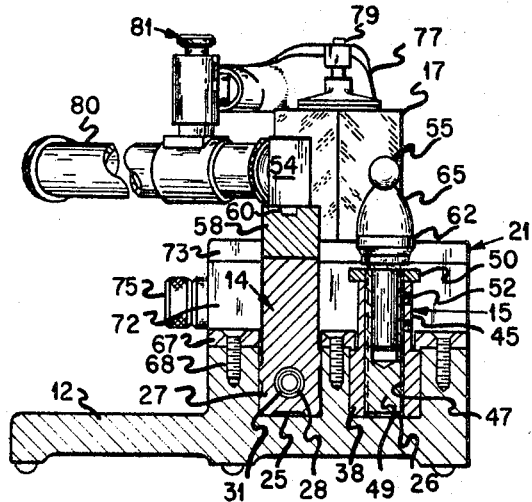
FIG. 2 is an elevational sectional view taken generally along the line 2—2 of FIG. 1.
Figure 3:
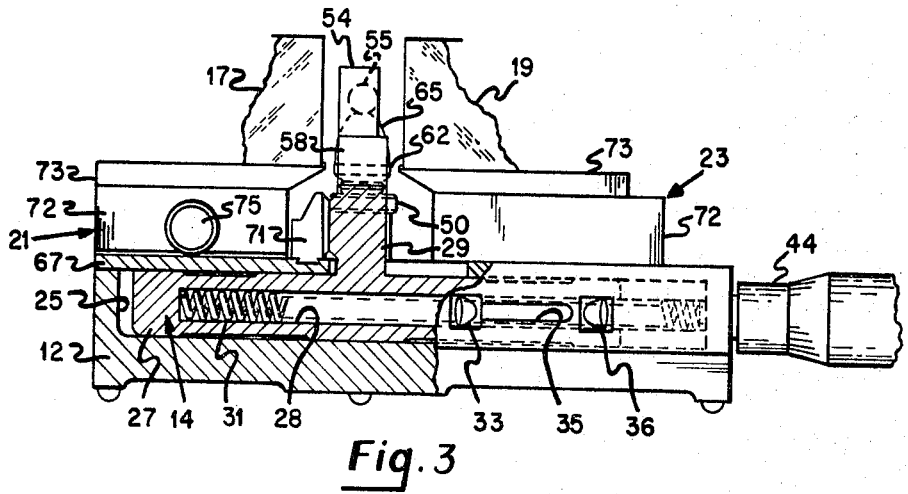
FIG. 3 is a front elevational view, partly broken away, of a base portion of the FIG. 1 device.

Described in greater detail and with reference to FIGS. 1–3, the interferometer of the present invention generally indicated at 10 may comprise a generally rectangular base or support member 12 housing object mounting and moving assemblies generally indicated at 14 and 15 and carrying a pair of longitudinally spaced-apart light beam splitters 17 and 19 which may be adjustably secured to the base 12 by mounting fixtures 21 and 23 for facilitating movement of the beam splitters towards or away from each other.

The base 12 may be provided with a pair of open-topped, generally rectangularly shaped, elongated slots 25 and 26 disposed in side-by-side relationship and underlying the mounting fixtures 21 and 23. Within these slots 25 and 26 the object mounting assemblies 14 and 15 are respectively disposed to provide selective movement of the objects in the space between the beam splitters 17 and 19. The mounting assembly 14 in slot 25 may be used to carry an object of known cross-sectional dimensions (which object may hereinafter be referred to as a gauge block) and may comprise an elongated, generally rectangularly shaped slide 27 having a centrally disposed bore 28 terminating therein and a projection 29 extending from the slide into the space between the beam splitters 17 and 19. In order to maintain the slide 27 in a desired position and yet permit selective movement of the slide, a compression spring 31 of a suitable material and strength may be disposed in the slot with one end of the spring bearing against an end wall of the slot and the other end extending into the bore 28 and abutting against the end thereof. With this arrangement the slide 27 is continually urged by the spring 31 towards the left end of the slot as viewed in FIG. 3. To move the slide against the bias of the spring 31 for measurement purposes described in detail below another projection 33 may be secured to the slide and extend through an elongated aperture 35 in an exposed shoulder of the base, thus enabling an operator to grasp the projection 33 as a handle and move it along a length of aperture 35 to selectively move the slide against the spring bias. To facilitate moving the slide 27 a stationary handle 36 may be attached to the base adjacent the aperture 35.

The mounting assembly 15 in the other slot 26 is preferably utilized to carry an object of unknown cross-sectional dimensions and is preferably movable in the slot in precisely measured increments. This mounting assembly may comprise an elongated, generally rectangularly shaped slide 38 having a bore 39 in registry with an end thereof and terminating adjacent the center thereof. A compression spring 40 of a suitable material and strength is disposed in the slot 26 with one end abutting against an end wall of the slot and the other end bearing against the inner end of the bore to continually urge the slide 38 towards the right end of the slot 26 as viewed in FIG. 1.

The slide 38 may be moved or driven in the slot 26 in either direction in positive measurable increments by utilizing a lead screw 42 which may extend into the slot 26 through an opening in the base 12 containing a suitably threaded insert with one end of the lead screw abutting against a surface of the slide 38 or fitting into a suitable receptacle therein and the other end secured to and actuatable by a suitable distance measuring device such as the micrometer shown at 44. The spring 40 helps to obtain accurate measurements in that the continuous bias provided thereby minimizes "backlash" in the lead screw 42. When using a micrometer to indicate and effect movement of the slide 38 it may be preferable to have the indicia on the micrometer read in microinch increments.

Slide 38 may be provided with a generally centrally disposed projection 45 extending from the bore 26 up into the space intermediate the beam splitters 17 and 19. This projection 45 may be provided with a throughgoing vertically oriented bore 47 for receiving a partially hollowed shaft 49 which may, in turn, be threadedly received in and vertically movable through a ring 50 positioned at the upper end of the projection. Suitable set screws 52 may extend through the projection 45 to secure the shaft 49 in a desired vertical position.

In order to secure and position an object of known cross-sectional dimensions, i.e., a master gauge block 54, on the mounting assembly 14 and an object of unknown cross-sectional dimensions, such as, for example, a sphere 55 on mounting assembly 15, suitable mounts or pedestals may be provided. For example, a pedestal for gauge block 54 may comprise a block 58 of a suitable material secured to or integral with the upper end of the slide projection 29 and provided with a suitable groove or "keyway" 59 on the uppermost surface thereof for receiving a lip or "key" 60 on underside of the gauge block 54. A pedestal or mount for the sphere 55 may comprise a flanged post 62 extending into the hollowed shaft 49 and carrying a generally tapered cylindrical body 64 of a suitable "soft" plastic material, e.g., nylon or the like, so as to provide adequate support for the sphere without damaging the surface thereof. The plastic body is preferably relieved at its upper end to provide a suitable receptacle for receiving the sphere 55.

While a generally cylindrical plastic body is utilized as a pedestal to carry a spherical object, it will appear clear that objects of other configurations may be supported by pedestals of different shapes and materials. Also, while the gauge block is of a rectangular configuration, it will be clear that gauge blocks of other configurations, such as spheres, cubes, etc., may be used.

After the mounting assemblies 14 and 15 are positioned in the base slots 25 and 26 a cover plate 67 may be placed on the base over the open slots and secured to the base in any suitable manner, e.g., the bolting arrangement 68 shown. This cover plate 67 is preferably provided with a pair of elongated apertures 69 and 70 encircling the slide projections for permitting movement of the latter in the space between the beam splitters.

In order to maintain the gauge block 54 in a desired location with respect to the prisms and to facilitate adjusting the effective size of the gauge block when measuring objects of larger dimensions than the gauge block as will be described in detail below, a slide stop or abutment 71 may be placed between mounting fixture 21 and the slide projection 29 such that the spring 31 continually urges the projection towards the abutment 71. This abutment 71, which is preferably provided with a flat surface to contact a similarly flat surface on the projection 29, may be carried by the cover plate 67 in any suitable manner such as by a key and keyway arrangement, bolts, etc.

The mounting fixtures 21 and 23 for the beam splitters 17 and 19, respectively, may be secured to the cover plate 67 by a bolting arrangement or in any other suitable manner and may each comprise a two-piece assembly, the lower part 72 of which may be secured to the cover plate 67 while the upper part 73 is carried by the lower part as to be relatively movable with respect thereto. This relative movement between the mounting fixture parts may be achieved in any suitable manner, such as, for example, a key and keyway arrangement. One of the mounting fixtures, e.g., fixture 21, or both fixtures, if desired, may be provided with a gear and rack assembly or other suitable structure (not shown) for facilitating movement of the upper part such as by rotating a simple driving device shown at 75. The movement of the mounting fixtures is preferably along a path parallel to the faces of the prisms mirroring each other across the space containing the objects to assure the maintenance of proper alignment between the beam splitters. The purpose for moving the mounting fixtures will be discussed below.

The spacing between the oppositely disposed prisms may be varied in any suitable manner from that shown in the drawings for measuring larger or smaller objects. For example, a cross-drive mechanism (not shown) may be used with one or both mounting fixtures 21 and 23 to move the upper parts 73 of the mounting fixtures along paths parallel to the slots 25 and 26. Or, if desired, one or both of the mounting fixtures may be positioned at other locations on the base 12 such as by using key and keyway arrangements (not shown).

The light beam splitters 17 and 19 may be of any suitable construction capable of dividing an incoming light beam from a light source into a pair of parallel exiting light beams and providing desired interference patterns of reflected light. For example, Kosters prisms, which comprise a pair of similarly sized right angled triangular prism wedges joined to define a prism in the configuration of an equilateral triangle with a semi-transparent surface or interface between the prism wedges and with a light reflecting surface on the hypotenuse of each prism wedge, have been found to provide satisfactory results.

The Kosters prisms or light beam splitters 17 and 19 are preferably similarly positioned on the upper parts 73 of the mounting fixtures 21 and 23 adjacent the peripheral edges thereof bordering and partially defining the space or opening between the prisms and are preferably so oriented with respect to each other and the intermediate objects 54 and 55 that the semi-transparent surfaces of the prisms are axially aligned or parallel to each other with an imaginary extension of these surfaces projecting through the space between the objects. In other words, the surfaces of prisms 17 and 19 mirroring each other across the space containing the objects are preferably parallelly disposed with the gauge block 54 being disposed between oppositely disposed prism wedges on one side of the semi-transparent surfaces while the sphere 55 is disposed between the other oppositely disposed prism wedges on the other side of the semi-transparent surfaces.

In order to place the semi-transparent surfaces of prisms 17 and 19 on essentially the same vertical plane and the faces of the prisms mirroring each other across the space containing the objects 54 and 55 in a parallel disposition, an optical aligning procedure may be used. After the prisms are positioned visually on the mounting fixtures an operator may observe the interference patterns through one of the prisms and adjust the orientation of the prisms on the mounting fixtures until a uniform higher order, i.e., a dark, interference pattern is observed. At this point the mirroring faces of the prisms will be essentially parallel to each other. If a zero-order fringe is observed during the above alignment on one side or the other of the pattern, it signifies that the semi-transparent surface of the prism being observed is not parallel with the semi-transparent surface of the other prism. One of the prisms may then be rotated about a vertical axis until the above uniform higher order interference pattern is observed, thus placing the semi-transparent surfaces on parallel planes. The driving device 75 may then be utilized to position the semi-transparent surfaces essentially directly across the space from each other.

Each prism 17 or 19 may be similarly secured to its particular mounting fixture. For example, prism 21 may be secured to the mounting fixture 17 by providing the latter with an arm 77 cantileveredly extending from a marginal surface of the upper part 73 of the fixture that is oppositely disposed from the marginal surface there of carrying the prism 21. This arm 77 may extend to about the center of the prism 17 and is preferably vertically spaced from the latter a sufficient distance as to not interfere with the passing of light through the prism or the observation of the interference patterns. The innermost end of the arm 77 overlying the prism may be provided with a vertical oriented threaded bore for receiving a vertically adjustable prism clamping device 79 which provides for selective movement of the prism and the maintaining of the latter in a desired location on the mounting fixture 21.

In addition to carrying the prism clamping device, the arm 77 may also carry and support a suitable interference pattern viewing device such as a microscope 80. The arm 77 may be provided with a suitable mechanism 81 for permitting vertical and horizontal movement of the microscope 80 so as to enable the latter to be moved into a desirable location with respect to the prism 17 for viewing the interference pattern.

Light sources 83 and 84 (FIG. 1) may be placed in appropriate positions adjacent the prisms 17 and 19, respectively, for providing the necessary light through the prisms to assist in the development of the interference patterns. It may be preferable to use extended light sources providing a white light so that light may be introduced into the prisms at all useful angles simultaneously.

Figure 4:
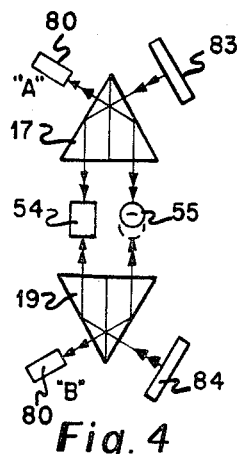
FIG. 4 is a diagrammatic representation of the FIG. 1 device as it may be used in measuring a spherical object.

In operation of the interferometer 10, the diametral measurement of a sphere 55 having a diameter slightly less than a known cross-sectional dimension of the master or gauge block 54 as shown in FIG. 4 may be readily and accurately determined in the following manner.

The micrometer 44 may be turned to move the sphere 55 towards one of the prisms—say, prism 17, until a circular white light interference pattern with the white zero-order fringe in the center of the pattern is observed through the microscope adjacent prism 17. This interference condition indicates that the leading surfaces of the block gauge and the sphere are equidistant from the prism 17. The micrometer reading corresponding to this position of the sphere is noted and may be referred to as "Reading A." If the sphere 55 is moved about five microinches towards or away from the prism 17, the white zero-order fringe leaves the center of the pattern and is replaced with black first-order fringe which is easily discernible so as to facilitate the positioning of the sphere 55 in a location essentially equidistant with the gauge block 54 from the prism 17. Consequently, a trained worker may make the Reading A determination with an accuracy of better than about five microinches.

After determining the position of Reading A, the sphere 55 may be moved away from prism 17 towards prism 19 (dotted lines in FIG. 4) by turning the micrometer 44 until the white zero-order fringe is observed through the microscope associated with prism 19. The micrometer reading at this sphere position is noted and may be referred to as "Reading B."

The difference between Readings A and B indicates the distance through which the sphere has been moved and the resulting figure is subtracted from the known cross-sectional dimension of the gauge block 54 to give the diameter of the sphere 55.

Figure 5:
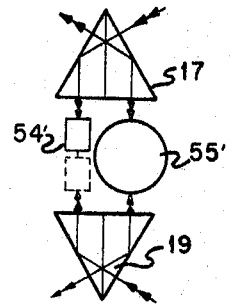
FIG. 5 is a diagrammatic representation of the FIG. 1 device showing how a spherical object of large diametrical dimensions may be measured.
Figure 6:
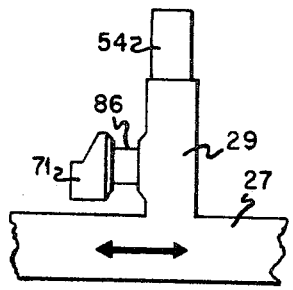
FIG. 6 is a simplified fragmentary representation of the FIG. 1 device showing details for achieving measurements of large spherical objects as in FIG. 5.

In the event the diameter of the sphere is larger than the known cross-sectional dimension of the gauge block as shown in FIG. 5, another, but somewhat similar, measuring procedure may be used in that the gauge block is moved the major distance between the prisms while the minute adjustments or movements are made with the micrometer. In order to accomplish this measurement the sphere 55' is first moved by the micrometer to a location equidistant with the gauge block 54' from the prism 17 (as shown in FIG. 5) to obtain Reading A' in a manner similar to that described above with respect to FIG. 4. After Reading A' is determined, the operator moves slide 27 away from the abutment 71 by moving the handle projection 33 towards the stationary handle 36 and while the slide 27 is so disposed places another gauge block 86 of known dimensions between the flat on abutment 71 and the flat on the slide projection 29 (FIG. 6). The slide 27 may then be released so that the spring 31 forces the projection 29 against the gauge block 86 to hold the latter in place and to position the gauge block 54' in a new location (dotted lines in FIG. 5).

The cross-sectional dimension of the gauge block 86 is preferably such that only a few thousandths of an inch movement of the sphere 55' by the micrometer is normally necessary to obtain the interference pattern for determining Reading B'. Thus, moving the gauge block 54' instead of the sphere the majority of the required distance minimizes potential lead screw error in the measurement. However, care should be exercised to assure that the contacting surfaces of gauge block 86, slide projection 29, and the abutment 71 are clean since small particulate matter on these surfaces may introduce an error as much as about 0.0001 of an inch.

To assure accuracy of the interferometer whether measuring large or small spheres or objects of other configurations, the prisms and the slides are perfectly so disposed that the slides 27 and 38 move along parallel paths that are parallel to the semi-transparent prism surfaces and perpendicular to the prism surfaces mirroring each other across the space containing the objects. Also, if desired, the slides 27 and 38 may be bearing-mounted (not shown) to facilitate the movement thereof.

It will be seen that the present invention sets forth a new and improved optical measuring system which is capable of providing dimensional measurements with an accuracy of better than ten microinches. Also, objects having a surface of revolution such as spheres and the like may have their cross-sectional dimensions accurately determined without contacting the surfaces of such objects with measuring apparatus.

As various changes may be made in the form, construction, and arrangement of the parts herein without departing from the spirit and scope of the invention and without sacrificing any of its advantages, it is to be understood that all matter herein is to be interpreted as illustrative and not in a limiting sense.

I claim:

1. An optical interferometer for determining cross-sectional dimensions of an object, comprising a pair of light-beam-splitting prisms disposed in spaced-apart locations with surface portions of said prisms mirroring each other across the space defined by the spaced-apart locations and having light-beam-dividing surfaces oriented in a coplanar relationship whereby light beams projectible from one of said pair of prisms through said space are parallel to one another and to light beams projectible from the other of said pair of prisms, mounting means for positioning an object of known cross-sectional dimensions in a first location intermediate said prisms and in said space, further mounting means for positioning another object of unknown cross-sectional dimensions in a second location intermediate said prisms and in said space adjacent to the object in said first location, object-positioning means for selectively and successively moving one of said mounting means towards said prisms along a path perpendicular to said surface portions and for indicating positional changes of said one mounting means, said object-positioning means effecting the movement of said one mounting means sufficient distances in opposite directions to alternately place the object positioned thereby and the other object in an equal spatial relationship with one of said prisms and then the other of said prisms, and means for successively observing through said prisms a zero order interference pattern indicative of said equal spatial relationship.

2. The device as claimed in claim 1, wherein an other object-positioning means selectively moves the other mounting means along a path parallel to the first-mentioned path.

3. The interferometer claimed in claim 1, wherein the first-mentioned object-positioning means comprises a micrometer, a lead screw for interconnecting said micrometer and said one mounting means, and spring means for continually urging said one mounting means against said lead screw.

References Cited

UNITED STATES PATENTS 3,068,363   12/1962   Samborski _____ 250—234

OTHER REFERENCES

"Parallel Testing Interferometer," James B. Saunders, Journal of Research of the National Bureau of Standards, vol. 61, No. 6, December 1958.

"A New Method of Measuring Gage Blocks," James B. Saunders, Journal of Research of the National Bureau of Standards, vol. 64C, No. 3, July–September 1960.

RONALD L. WIBERT, *Primary Examiner.*

C. CLARK, *Assistant Examiner.*